United States Patent [19]

Prasad et al.

[11] Patent Number: 5,547,494
[45] Date of Patent: Aug. 20, 1996

[54] STAGED ELECTROLYTE MEMBRANE

[75] Inventors: Ravi Prasad, East Amherst; Christian F. Gottzmann, Clarence, both of N.Y.

[73] Assignee: Praxair Technology, Inc., Danbury, Conn.

[21] Appl. No.: 408,857

[22] Filed: Mar. 22, 1995

[51] Int. Cl.[6] .............................. B01D 53/22; B01D 71/02
[52] U.S. Cl. .............................. 95/54; 95/12; 95/23
[58] Field of Search .......................... 95/45, 54, 12, 95/23; 96/4

[56] References Cited

U.S. PATENT DOCUMENTS

| 4,725,346 | 2/1988 | Joshi | 204/242 |
|---|---|---|---|
| 5,021,137 | 4/1991 | Joshi et al. | 204/242 |
| 5,035,726 | 7/1991 | Chen et al. | 55/16 |
| 5,035,727 | 7/1991 | Chen | 55/16 |
| 5,045,169 | 9/1991 | Feduska et al. | 204/258 |
| 5,108,465 | 4/1992 | Bauer et al. | 95/54 |
| 5,118,395 | 6/1992 | Chen et al. | 95/54 X |
| 5,160,713 | 11/1992 | Mazanec et al. | 95/54 X |
| 5,169,415 | 12/1992 | Roettger et al. | 95/54 |
| 5,174,866 | 12/1992 | Chen et al. | 95/54 X |
| 5,240,473 | 8/1993 | Carolan et al. | 95/54 |
| 5,240,480 | 8/1993 | Thorogood et al. | 95/54 X |
| 5,261,932 | 11/1993 | Carolan et al. | 95/54 |
| 5,269,822 | 12/1993 | Carolan et al. | 95/54 |
| 5,378,263 | 1/1995 | Prasad | 95/54 |
| 5,447,555 | 9/1995 | Yee et al. | 95/54 |
| 5,454,923 | 10/1995 | Nachlas et al. | 204/270 |

FOREIGN PATENT DOCUMENTS

| 49-123186 | 11/1974 | Japan | 95/45 |
|---|---|---|---|
| 57-207533 | 12/1982 | Japan | 95/54 |
| 2-261513 | 10/1990 | Japan | 95/45 |
| 2257054 | 1/1993 | United Kingdom | 95/54 |

OTHER PUBLICATIONS

Robert A. Huggins, "Ionically Conducting Solid–State Membranes," Advances in Electrochemistry and Electrochem. Engrg., 1977 Series 10.

D. J. Clark, R. W. Losey and J. W. Suitor, "Separation of oxygen by using zirconia solid electrolyte membranes," *Gas separations & Purification* 1992 vol. 6 No 4 201–205.

*Primary Examiner*—Robert Spitzer
*Attorney, Agent, or Firm*—Douglas E. Denninger

[57] ABSTRACT

Oxygen is separated from a feed air stream to produce enriched oxygen permeate and oxygen depleted retentate gas. At least first and second process stages, arranged in series, each include a solid electrolyte membrane separating gas chambers with a retentate side in the former and a permeate side in the latter, a cathode connected to the retentate side, and an anode connected to the permeate side. Feed gas is introduced into a first gas chamber of the first process stage. The cathode and anode of the first process stage are electrically energized to drive oxygen from the feed gas in the first gas chamber through the electrolyte membrane at a first flux into a second gas chamber. Oxygen-depleted retentate gas from the first process stage is delivered to a third gas chamber of the second process stage. Similarly, the cathode and anode of the second process stage are electrically energized by a current less than that of the first process stage and at a greater voltage. Oxygen-depleted retentate gas is withdrawn from the second process stage and. permeated oxygen is withdrawn from the second gas chamber and a fourth gas chamber of the first and second process stages.

20 Claims, 5 Drawing Sheets

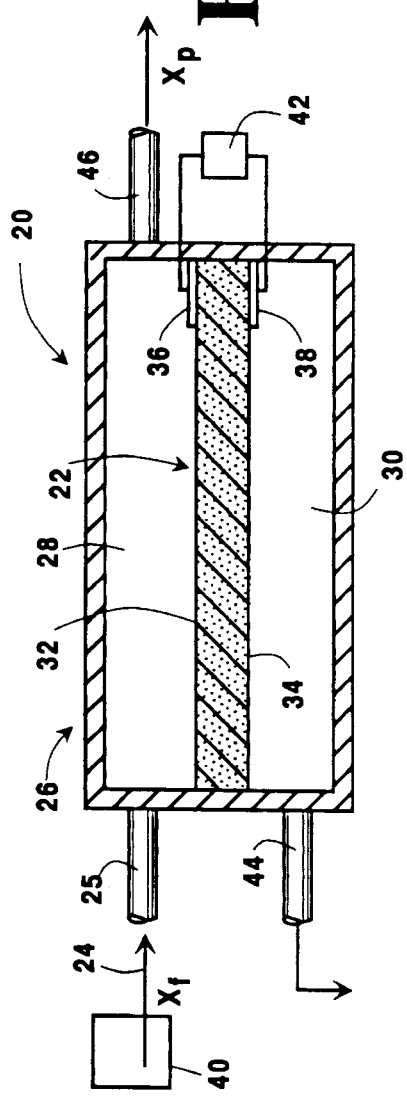
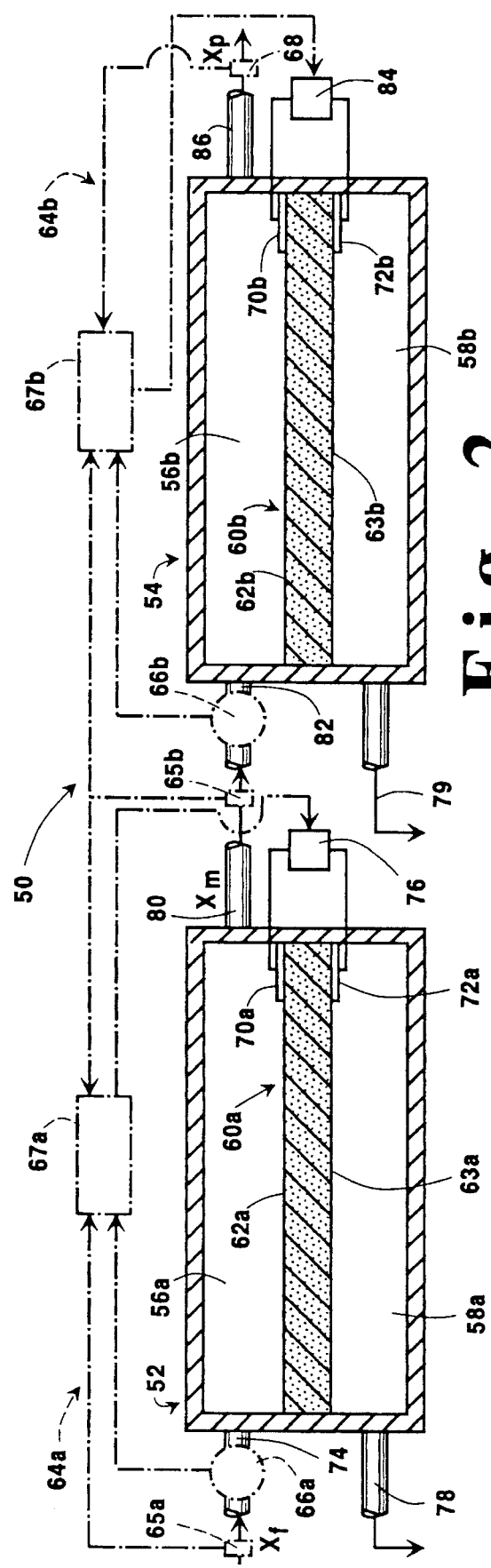

STAGED ELECTROLYTE MEMBRANE

FIELD OF THE INVENTION

This invention relates to a process for separating oxygen from a feed gas stream including a mixture of oxygen and other gases to produce an enriched oxygen gas stream and an oxygen depleted gas stream, and more particularly to such a process using at least two electrolyte membranes operating at different current and voltage levels.

BACKGROUND OF THE INVENTION

Certain types of membranes have been used for many years to separate selected gases from air and other gas mixtures. Composite hollow fibers, employing organic polymer membranes, may have separation factors that favor the permeation of oxygen over nitrogen by a factor of ten or less. Processes employing such membranes have been devised for the production of oxygen and particularly nitrogen from ambient air.

An entirely different type of membrane can be made from certain inorganic oxides, typified by calcium or yttrium stabilized zirconia and analogous oxides with the fluorite structure. At elevated temperatures, these materials contain mobile oxygen-ion vacancies. When an electric field is applied, these materials will transport oxygen, and only oxygen, and thus can act as a membrane with an infinite selectivity for oxygen. These membranes are thus very attractive for use in new air separation processes.

Although the potential for these materials as gas-separation membranes is great, there are certain problems in their use. The most obvious problem is that all known materials exhibit appreciable oxygen-ion conductivity only at elevated temperatures. In general they must be operated well above 500° C. Much research has been done to find materials that work at lower temperatures, but this limitation remains.

Electrically driven oxide membranes require conducting electrodes on both surfaces for the application of the electric field. These electrodes should, preferably, be porous or otherwise permeable to air and oxygen. Materials such as ceramic lanthanum strontium cobaltite fulfill these requirements. The reaction of oxygen has been shown to occur in the region where all three phases, gas-electrode-electrolyte, converge:

$$(½)O_2(g) + 2' \rightleftharpoons O" \quad (1)$$

$$O" + [V_{O"}]_{electrolytes} = nil$$

The oxygen ions annihilate oxygen-ion vacancies $[V_{O"}]$ which are highly mobile in the electrolyte. At the cathode, two electrons must be supplied for each oxygen ion created, or four electrons for each molecule of oxygen gas that is ionized. Thus 4 Faradays or 386 million Coulombs of charge must be supplied for each kmole of oxygen transported. The required electrical current is:

$$I = 386 \times 10^6 \times Q \quad (2)$$

where: Q is the oxygen flux in kmols s$^{-1}$.

The theoretical minimum voltage required is given by the Nernst equation:

$$V = \frac{RT}{4F} \ln\left(\frac{p_2}{p_1}\right) \quad (3)$$

where:
R is the gas constant=8.31×10$^3$ J kmol$^{-1}$ K$^{-1}$
T is the Temperature, ° K.
F is Faradays constant=9.65×10$^7$ C kmol$^{-1}$
$p_1$ is the partial pressure of $O_2$ on the cathode side
$p_2$ is the partial pressure of $O_2$ on the anode side
Equation (3) is hereinafter referred to as the Nernst Equation. The oxygen partial pressure, $p = Y_o \times P$, is the product of the oxygen mole fraction and the total pressure.

The power required is the product of the current and the voltage. It is apparent that the power is necessarily high when large quantities of oxygen are to be transported. For this reason, the electrically driven processes are less attractive for the bulk separation of oxygen from air, except for small specialized applications.

A process using electrically driven oxide membranes is much more attractive for the removal of small quantities of oxygen from nitrogen, argon or other gas streams. In this case, the power needed depends on the partial pressure of oxygen that can be tolerated in the product stream, on the cathode side of the membrane. Since only oxygen is transported, the anode side is usually pure oxygen. The minimum voltage must be greater than that given by the Nernst equation for these conditions. Unfortunately, even this minimum required power is too large for many commercial applications.

It has been a problem to find a practical means to reduce the power required for removing oxygen from a gas stream by electrically driven permeation through a solid-electrolyte membrane. Although research on electrolytic oxygen-ion conductors has been carried on for many years, these processes seldom have been used commercially for gas separation or purification. One reason for this is the large electrical power required by these processes per unit amount of $O_2$ removal. Because of the infinite selectivity exhibited by solid-electrolyte membranes, most of the interest in these materials has been for producing small quantities of pure $O_2$ for specialized applications.

Recent advancements in the state of the art of air separation using inorganic oxide membranes have been presented in the technical literature. For example, in a 1977 paper entitled "Ionically Conducting Solid-State Membranes" in the journal *Advances in Electrochemistry and Electrochem. Engrg.*, R. A. Huggins provided an early review article on all types of solid-state ionic conductors, including cubic stabilized zirconia and other oxides of the fluorite structure.

In their 1992 paper entitled "Separation of Oxygen by Using Zirconia Solid Membranes", appearing in *Gas Separation Purification*, Vol. 6, No. 4, at pages 201–205, D. J. Clark, R. W. Losey and J. W. Suitor describe the production of $O_2$ for special applications such as space travel. While multicell stacks are described, there is no mention of "tagging" as provided by the present invention.

Turning to the patent literature, U.S. Pat. No. 4,725,346 to Joshi describes a device and assembly for producing oxygen, using oxygen-conducting metal oxide electrolytes. Subsequently, in U.S. Pat. No. 5,021,137, Joshi et. al. describe a cell based on doped cerium oxide with lanthanum strontium cobaltite electrodes.

In U.S. Pat. No. 5,045,169, Feduska et. al. disclose various device configurations wherein several electrochemical cells are connected so that they are electrically in series, thus raising the overall voltage to a more practical value. The devices described are for the production of oxygen, not for the removal of oxygen from inert gas streams. Nor does the patent describe the use of multiple cells connected in two or more stages with respect to the gaseous stream being treated, which is the subject matter of the present disclosure.

U.S. Pat. No. 5,035,726 to Chen discloses the use of electrically driven solid-electrolyte membranes for the removal of low levels of oxygen from crude argon streams. He estimates the electrical power needed for several examples of multistage processes. The voltage is constant for the early stages of the examples cited. The potential benefits of staged processes in reducing the power are thus not fully realized.

In U.S. Pat. No. 5,035,727, also to Chen, advantage is taken of the high-temperatures available from the exhaust of an externally-fired gas turbine to produce oxygen by permeation through a solid-electrolyte membrane.

OBJECTS OF THE INVENTION

Therefore, it is an object of the present invention to provide an improved, more efficient process of using solid electrolyte ionic conductor membranes to consume less power.

It is a further object of this invention to provide such a method which decreases power losses from resistive heating or dissipation.

Yet another object of this invention is to provide a process which enables use of different membrane materials in different stages.

SUMMARY OF THE INVENTION

This invention comprises a process of separating oxygen from a feed gas stream including a mixture of oxygen and at least one other gas to produce enriched oxygen permeate and oxygen-depleted retentate gas. The feed gas is introduced into a first gas chamber of a first process stage of at least two process stages arranged in a series feed relationship. The first chamber is separated from a second gas chamber by a first electrolyte membrane. A first oxygen flux through the first membrane is selected, and a first electrical current to and a first voltage across the first membrane are provided to drive oxygen substantially at the first flux to obtain oxygen depleted retentate gas from the first chamber and enriched oxygen permeate from the second chamber. Oxygen-depleted retentate gas from the first process stage is delivered to a third gas chamber of a second process stage, the third chamber being separated from a fourth gas chamber by a second electrolyte membrane. A second oxygen flux through the second membrane is selected and a second electrical current to and a second voltage across the second membrane are provided to drive oxygen substantially at the second flux to obtain oxygen depleted retentate gas from the third chamber and enriched oxygen permeate from the fourth chamber, the second current being smaller than the first current and the second voltage being larger than the first voltage.

In a preferred embodiment, there are less than six stages, and more preferably two or three stages. Voltage increases at least ten percent per stage as calculated according to the Nernst Equation, and current decreases in each successive stage, More preferably, the power consumed by each successive stage is less than fifty percent of the power consumed by the preceding stage. At least one stage has two or more modules arranged in either a series feed or a parallel feed arrangement within that stage.

BRIEF DESCRIPTION OF THE DRAWINGS

Other objects, features and advantages will occur to those skilled in the art from the following description of preferred embodiments and the accompanying drawings, in which:

FIG. 1 is a schematic representation of a known system for oxygen removal using a solid electrolyte membrane in a single stage process;

FIG. 2 is a schematic representation of a system embodying the invention for oxygen removal using solid electrolyte membrane in a multiple stage process;

DETAILED DESCRIPTION OF THE INVENTION

Figure 3:
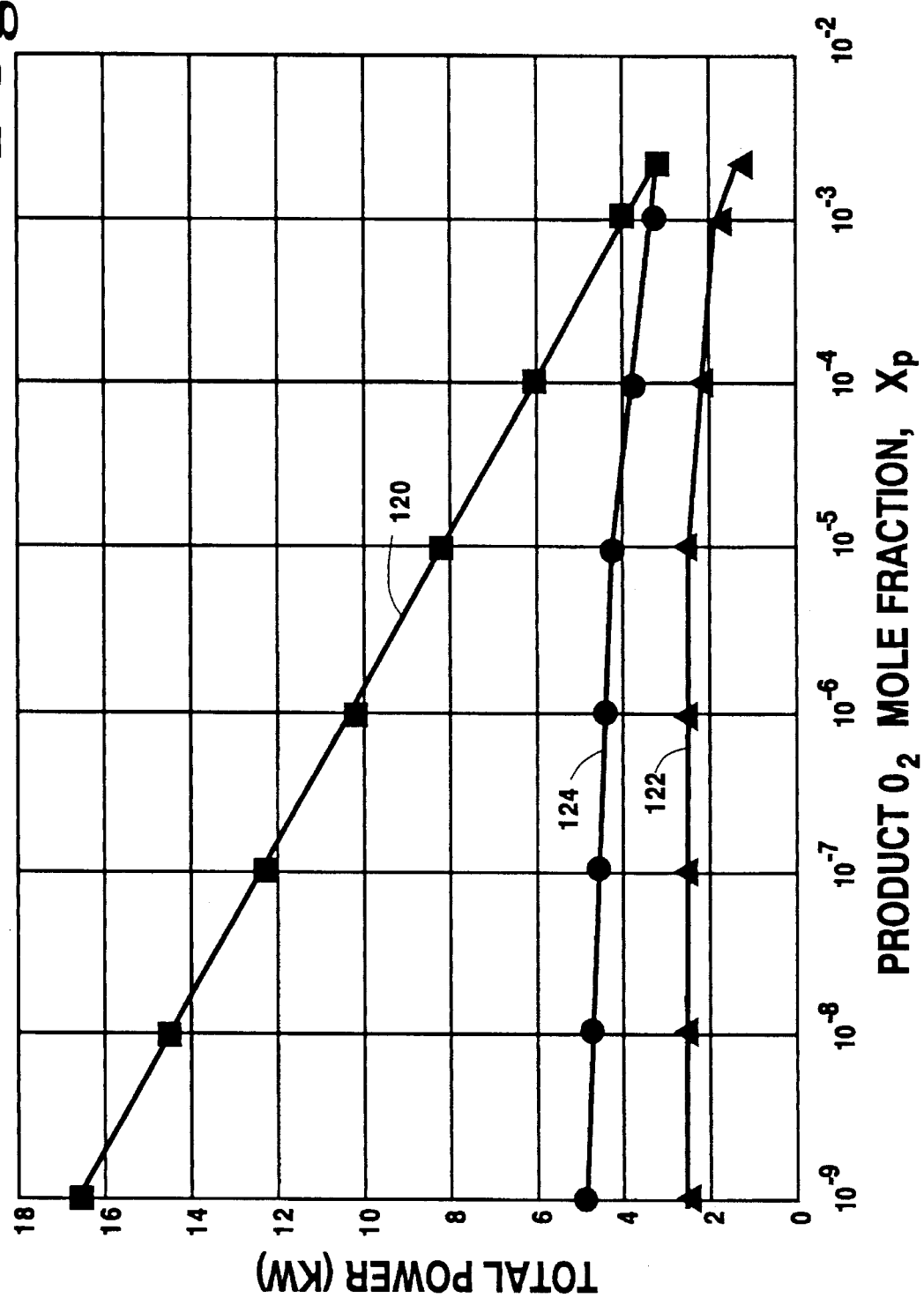
FIG. 3 is a graph depicting the power required to drive the systems of FIG. 1 and 2, respectively, as a function of the mole fraction of oxygen in the product.

This invention may be accomplished by a method of separating oxygen from a feed gas stream to produce a permeate of enriched oxygen and a retentate of oxygen depleted gas. At least first and second process stages, arranged in feed series, each include a solid electrolyte membrane, sometimes referred to as a "SELIC" membrane, which designates a solid electrolyte ionic or mixed conductor membrane. SELIC membranes utilized according to the present invention must be capable of being electrically energized. Each SELIC membrane separates first and second gas chambers with a retentate side in the former and a permeate side in the latter, a cathode connected to the retentate side, and an anode connected to the permeate side.

Feed gas is introduced into the first gas chamber of the first process stage. The cathode and anode of the first process stage are electrically energized at a first electrical current and a first voltage to drive oxygen from the feed gas in the first gas chamber through the first electrolyte membrane into the second gas chamber, the electrical current being directly proportional to the flow rate of the oxygen through the first membrane in the first stage.

The first voltage applied across the first membrane must exceed the Nernst potential as calculated by the Nernst Equation, which is proportional to the log of the oxygen partial pressures as defined in the Background above. The value of the voltage is adjusted to account for additional factors such as the resistance of the electrolyte and overvoltages at the electrodes. Overvoltages, also referred to as overpotentials, describe excess voltage that must be applied to overcome non-idealities such as the kinetics of oxygen dissociation and recombination at the electrodes, diffusion of oxygen to and from each electrode and the bulk gas on that side of the membrane, interfacial resistance between the electrodes and the electrolyte, and rate limitations related to charge transfer.

Oxygen-depleted retentate gas from the first process stage is delivered to the first gas chamber of the second process stage. According to the present invention, the cathode and anode of the second process stage are electrically energized by a current less than that of the first process stage and at a greater voltage. Oxygen-depleted retentate gas is withdrawn from the second process stage and permeated oxygen is withdrawn from the second and fourth gas chambers of the first and second process stages, respectively.

The essence of the invention is to conduct the separation or purification process in stages, wherein the Nernst Equation voltage increases in each successive stage relative to the Nernst Equation voltage for the preceding stage and the current, proportional to the oxygen flux, decreases in each successive stage:

$$V_1 < V_2 < V_3 \ldots V_n \quad (4)$$

$$I_1 > I_2 > I_3 \ldots I_n$$

The power required in an individual stage can be reduced or minimized and, thereby, the overall power efficiency enhanced. While an idealized process would utilize a large numbers of stages, most of the power reduction can be achieved in two or three stages according to the invention.

Process configurations according to the present invention reduce the electrical power required for the practical removal of moderate quantities of oxygen from gas streams to produce an oxygen-depleted product. These are more efficient and require less power than previously described processes. In principle, for purification applications, power savings of 50–80% over the simple single stage electrically driven process can be achieved.

A known system 20 is schematically illustrated in FIG. 1 for oxygen removal using solid electrolyte membrane 22 in a single stage process. A feed gas stream, also referred to as feed stock, including a mixture of oxygen and another gas is introduced via an inlet duct to a process stage 26 for the purpose of producing an oxygen enriched product and an oxygen-depleted product. The process stage 26 includes first and second gas chambers 28, 30 with the solid electrolyte membrane 22 separating the gas chambers.

The solid electrolyte membrane 22 has a retentate side 32 in the first gas chamber 28 and a permeate side 34 in the second gas chamber 30. A cathode 36 is connected to the retentate side of the electrolyte membrane and an anode 38 is connected to the permeate side of the electrolyte membrane.

A suitable precursory system 40 is provided for introducing feed gas as the stream 24 through inlet duct 25 into the first gas chamber 28 at an elevated temperature in excess of 500° C., the feed gas typically including a mixture of oxygen and inert gas. An electrical power source 42 applies a voltage across the cathode 36 and the anode 38 to drive oxygen from the feed gas in the first gas chamber through the electrolyte membrane 22 into the second gas chamber. The power source 42 is operated at an electrical current which is directly proportional to the selected oxygen flux across the membrane 22 and at a voltage proportional to the log of the partial pressures of oxygen on the retentate and permeate sides 32, 34 of the solid electrolyte membrane 22. The voltage is adjusted for electrolyte resistance and overvoltages as described above.

As the feed stock flows over the SELIC membrane 22, oxygen contained in the crude feed stock is selectively transported through the SELIC membrane. Hence, the oxygen concentration is progressively reduced as the externally applied electromotive force drives oxygen transport across the membrane. The process extracts oxygen from the gas in chamber 30, which establishes a composition gradient along the surface of the electrolyte. The lowest oxygen partial pressure will be $p_1 = Y_{oprod} \times P_1$, the partial pressure of oxygen in the product. Unless a purge or vacuum is employed, the permeate partial pressure $P_2$ will be one atmosphere of pure oxygen. Permeated oxygen is withdrawn from the second gas chamber 30 via an extraction duct 44 and oxygen-depleted retentate gas is withdrawn from the first gas chamber 28 via an exit duct 46.

The power to operate a single-stage process, such as shown in FIG. 1, is a product of current and voltage as presented by Equations (2) and (3) above. This product is governed by the Nernst voltage given by the Nernst Equation, wherein the partial pressure on the cathode side is the partial pressure of oxygen in the retentate stream. Thus the purer the retentate, that is, the less oxygen in the feed stock, the lower the $p_1$ value required.

Some prior art systems connect several SELIC membrane separator units in feed series, and refer to each unit as a stage. Substantially the same voltage is maintained across a number of these conventional stages.

In a method according to the present invention, however, subsequent stages are distinguished from previous stages by a decrease in current and an increase in voltage attributable to the Nernst potential as calculated by the Nernst Equations. Less oxygen is extracted in each successive stage than in the preceding stage. Preferably, voltage increases by at least ten percent from stage to stage, as calculated by the Nernst Equation.

In one embodiment, the quantity of extracted oxygen decreases by at least fifty percent from stage to stage, and voltage attributable to the Nernst potential increases by at least forty percent per stage. Voltages are in the range of 0.05 to 5 volts, preferably 0.5 to 2.5 volts. Actual voltages and voltage increases from stage to stage vary according to other, non-Nernst potential factors such as electrode overvoltages and electrolyte resistances.

The Nernst potential can be reduced for a given stage by decreasing the oxygen partial pressure on the anode side. This can be accomplished by purging the downstream side of the membrane, vacuum pumping to reduce the pressure on the downstream side of the membrane, pressurizing the feed stream on the upstream side of the membrane, and the like.

When a process according to the invention is conducted in multiple stages operated in feed series, as depicted by the multiple stage system 50 shown in FIG. 2 (only two stages are actually illustrated, for simplicity), the voltage $V_1$ of the first stage is reduced from that required for the system 20, FIG. 1, to take advantage of the fact that the retentate product of the first stage is of lower purity than the final retentate product. While the voltage $V_2$ of the second stage is larger than that of the first stage, the oxygen flux is reduced and thus the current is modest, and therefore the power consumed by the second stage is low. For a high-purity, low oxygen product, the overall power required for the two-stage process can be much less than that required for the single-stage prior art process.

The multiple stage system 50 of the invention as illustrated in FIG. 2 includes at least first and second process stages 52, 54 arranged in a series relationship. Each of the process stages 52, 54 includes first and third feed gas chambers 56a, 56b separated by a solid electrolyte membrane 60a, 60b which, in turn, has a retentate side 62a, 62b in the first and third gas chambers 56a, 56b and a permeate side 63a, 63b in the second and fourth permeate gas chambers 58a, 58b. A cathode 70a, 70b is connected to the retentate side 62a, 62b of the electrolyte membrane 60a, 60b and an anode 72a, 72b is connected to the permeate side 63a, 63b of the electrolyte membrane 60a, 60b respectively.

As in the instance of the system, feed gas including a mixture of oxygen and another gas at an elevated temperature in excess of 500° C. is introduced via an inlet duct 74 into the first gas chamber 56a of the first process stage 52.

A first electrical power source 76 is provided for energizing the cathode and the anode of the first process stage to drive oxygen from the feed gas in the first gas chamber through the electrolyte membrane into the second gas chamber. The power source 76 is operated at a current directly proportional to the flow rate of the oxygen through the membrane 60a and at a voltage inversely proportional to the log of the partial pressures of oxygen on the retentate side 62a and the permeate side 63a of the solid electrolyte membrane 60a.

Permeated oxygen is withdrawn from the second gas chamber 58a of the first process stage 52 via an extraction duct 78 and from the second gas chamber 58b of the second process stage via an extraction duct 79. Oxygen-depleted retentate gas is withdrawn from the first gas chamber 56a of the first process stage 52 via an exit duct 80 which is in communication with an inlet duct 82 into a first gas chamber 30 of the second process stage 54.

A second electrical power source 84 for energizing the cathode 70b and the anode 72b of the second process stage 54 to drive oxygen from the retentate side 62b in the first gas chamber through the electrolyte membrane into the second gas chamber. The second power source 84 is operated at a current less than that generated by the first power source 76 and at a voltage greater than that generated by the first power source. As a result of the process described, substantially oxygen-depleted retentate gas is withdrawn from the second process stage 54 via an exit duct 86.

To compare the efficiencies of the process of the invention as performed by the system 50, FIG. 2 with the conventional process as performed by the system 20, FIG. 1, the electrical power was computed for various process configurations. For these computations, as plotted in FIG. 3, it has been assumed that the feed stream is 10,000 NCFH (normal cubic feet per hour) of a gas mixture containing 2% oxygen at a pressure of 100 psig. The permeate is taken to be pure oxygen at (nearly) atmospheric pressure or 15 psia. The essential part of the present invention is the determination of the relative amounts of $O_2$ to be removed in the successive stages as well as the operating voltages and currents of the stages so as to optimize the power requirement for the overall process. The electric current and voltage were determined from Equations (2) and (3), from which the power is computed. The Nernst voltage, Equation (3), depends on the product partial pressure of oxygen, $p_1$. In order to have sufficient driving force, an electrode overvoltage of 50% has been assumed, meaning that the applied voltage is 150% of the Nernst potential. In all of the following calculations, the temperature of operation has been assumed to be 800° C. or 1073.15° K.

The power required for the single-stage apparatus 20, FIG. 1, is plotted as line 120 in FIG. 3 as a function of the logarithm of the mole fraction of oxygen in the product. Line 120 shows that the power (in kilowatts) increases linearly with each decade of reduction of the oxygen mole fraction in the product, as expected from the form of the Nernst Equation. The power needed to make a very pure product becomes very large. For example, FIG. 3 shows that more than 16 kW, corresponding to a voltage of 0.65 V and a current of $2.5 \times 10^4$ A, must be supplied to make a product that has an oxygen mole fraction of one part per billion in $N_2$ for the gas flows indicated in the above example.

The minimum theoretical power for removing the oxygen from an impure gas stream corresponds to the power that would be required to operate an infinite number of stages each infinitesimally decreasing the oxygen content of the gas. This minimum power is also dependent on the oxygen content of the product stream. The calculated minimum theoretical power is also plotted as curve 122 in FIG. 3. In order to make the comparison equitable, the voltage employed in these calculations included a 50% overvoltage per stage, similar to the overvoltage used in the other power calculations. As FIG. 3 shows, the modified minimum theoretical power is nearly constant and equal to approximately 2.5 kW for all but the highest mole fractions of oxygen in the product where it is somewhat lower. For all of the oxygen depleted retentate streams (those with a low mole fraction of oxygen) the conventional single-stage power greatly exceeds the minimum theoretical power.

In the two-stage process according to the invention for system 50, FIG. 2, each stage is driven with a separate voltage. The voltage $V_2$ required for the second stage depends on the pressure and the product oxygen content $X_p$ and is similar to that required by the single-stage process. The voltage $V_1$ required for the first stage depends on the pressure and the interstage oxygen content $X_m$. In FIG. 3, the total power has been computed and drawn as curve 124 for the two-stage process where the midstage oxygen content $X_m$ is 0.2%, or 1/10th of the feed concentration. Thus 90% of the contained oxygen is removed in the first stage and the remainder in the second stage. The current in the first stage is large, but the voltage is relatively low. Conversely, in the second stage, the voltage is high as dictated by the product purity, but the current is low. The curve 124 for overall power is only slightly sensitive to product purity and the power is about twice the theoretical minimum power of curve 122.

System 20, FIG. 1, and system 50, FIG. 2, have been described as operating at a constant voltage and current for each stage. This situation is satisfactory when the flow rate and oxygen concentration of the feed stock remains substantially constant.

In one construction, system 50 includes control systems 64a, 64b, shown in phantom in FIG. 2. Control systems 64a, 64b include oxygen sensors 65a, 65b, 68 and flow meters 66a, 66b which provide feed oxygen concentration and flow rate, respectively, to controllers 67a, 67b. Sensor 65b supplies midpoint oxygen concentration $X_m$ to both controllers 67a and 67b; final product oxygen concentration $X_p$ is supplied to controller 67b by sensor 68. Controllers 67a, 67b use the inputs to recalculate optimal voltages using the Nernst Equation and command power sources 76, 84 to vary the voltages applied to each stage according to changes in the feed oxygen concentration or feed flow rate to optimize oxygen removal from each stage. The minimum current in each stage is proportional to Q $(X_{in} - X_{out})$. Alternatively, power sources 76, 84 provide a constant respective voltage to each stage with the current level floating according to changes in the feed oxygen concentration or flow rate.

Examples of electrolyte materials that can be used in the present invention are given in Table 1.

TABLE 1

EXAMPLES OF IONIC CONDUCTING SELIC MATERIALS

| TYPE | # | MATERIALS COMPOSITION |
|---|---|---|
| Ionic | 1 | $ZrO_2$—$Y_2O_3$ (8% $Y_2O_3$ by wt.) |
| | 2 | $(Bi_2O_3)_X(M_{Y1}O_{Y2})_{1-X}$ Where M = Sr, Ba, Y, Gd, Nb, Ta, Mo, W, Cd, Er and $0 \leq x \leq 1$ |
| | 3 | $CaTi_{0.7}Al_{0.3}O_{3-\Delta}$ $CaTi_{0.5}Al_{0.5}O_{3-\Delta}$ $CaTi_{0.95}Mg_{0.05}O_{3-\Delta}$ where $\Delta$ from stoichiometry |
| | 4 | $ZrO_2$—$Y_2O_3$—$Bi_2O_3$ mixtures |
| | 5 | $ZrO_2$—$Tb_4O_7$ mixtures |
| | 6 | $BaCeO_3$:Gd $BaCeO_3$; $BaCeO_3$:Y; $BaCeO_3$:Nd |
| | 7 | $La_xSr_{1-x}Ga_yMg_{1-y}O_{3-\Delta}$ Where $0 \leq x \leq 1$, $0 \leq y \leq 1$, $\Delta$ from stoichiometry |

The SELIC membranes employed in the separator units are constructed of dense, ceramic oxides or mixtures of oxides, characterized by oxygen vacancies in their crystal lattice caused by defects or the introduction of dopants (such as, Y, Sr, Ba, Ca and the like), such as shown in Table I above. A vacancy diffusion mechanism is the means by which oxygen ions are transported through the crystal lattice. In general, elevated temperatures of 400° C. to 1200° C., preferably 500° C. to 900° C., should be maintained during operation to achieve high mobilities of the vacancies. Large vacancy concentrations combined with high mobilities of the vacancies form the basis for rapid oxygen ion transport through the materials from which the SELIC membranes are constructed. Since oxygen ions may occupy the crystal lattice vacancies in preference to other elements, the ideal SELIC membranes posses infinite oxygen selectivity.

In the present invention, the SELIC separators employed have several advantages over currently available technology for oxygen removal or purification: the SELIC separator is simple and compact, operates continuously, and is capable of achieving nearly complete deoxygenation of the feed stream. Since catalytic deoxygenation is not involved, the need for a hydrogen supply is obviated and hydrogen contamination of the product and additional downstream processing for its removal is also obviated.

Different types of SELIC materials may be employed in a SELIC separator unit keeping with the spirit of the present invention. The SELIC membrane is comprised of a material that is primarily an oxygen ion conductor (e.g., yttria-stabilized zirconia sandwiched between two porous electrodes. Electron conductivity of the electrolyte is undesirable because it leads to short-circuiting of the cell which increases power consumption. In practice, oxygen molecules diffuse through one of the porous electrodes to the electrolyte surface, at which point dissociation into oxygen ions occurs. That first porous electrode provides electrons for the process. The oxygen ions diffuse through the electrolyte and reach the second porous electrode, where recombination occurs thereby forming oxygen molecules and releasing electrons in the process. The electrons are returned to the first porous electrode for oxygen ionization by an external circuit.

As an alternative, the SELIC membrane used in this invention may be comprised of a material that conducts oxygen ions and electrons referred to as mixed conductors, so long as it is sandwiched between two layers of a primarily ionic conductor so that shorting of the cell does not occur. Porous electrodes would need to be deposited on both outer sides of the sandwich.

SELIC membranes themselves are not to date believed to be commercially available. However, materials used to prepare SELIC membranes are commercially available, such as from Seattle Specialty Chemicals, Woodinville, Wash.

The thickness of the SELIC membrane should be below about 5000 μm, with below about 500 μm being preferred and below about 50 μm being more preferred. The commercially available materials used to prepare SELIC membranes may be fabricated into thick self-supporting films or thin films supported on a porous substrate.

SELIC membranes in the form of thin films (e.g., having a thickness within the range of from about 50 μm to about 1000 μm) are advantageously supported on porous substrates. Such porous substrates may be made either of one of the electrode materials or of another material so long as the porous electrode material is deposited between it and the electrolyte. If the film thickness is large (e.g., above about 1000 μm), the SELIC membrane may be self-supporting. The SELIC membrane may also be deployed as a flat, planar film or as a tubular member, with the latter being preferred.

The absolute pressures established on both sides of a SELIC membrane depend on the membrane structure as well as the particular application. Planar membrane panels, typically used in fuel cells, prefer experiencing substantially the same absolute pressure on both sides of the membrane. Tubular or other supported membranes can tolerate a higher absolute pressure on one side, such as on the anode side.

Figure 4:
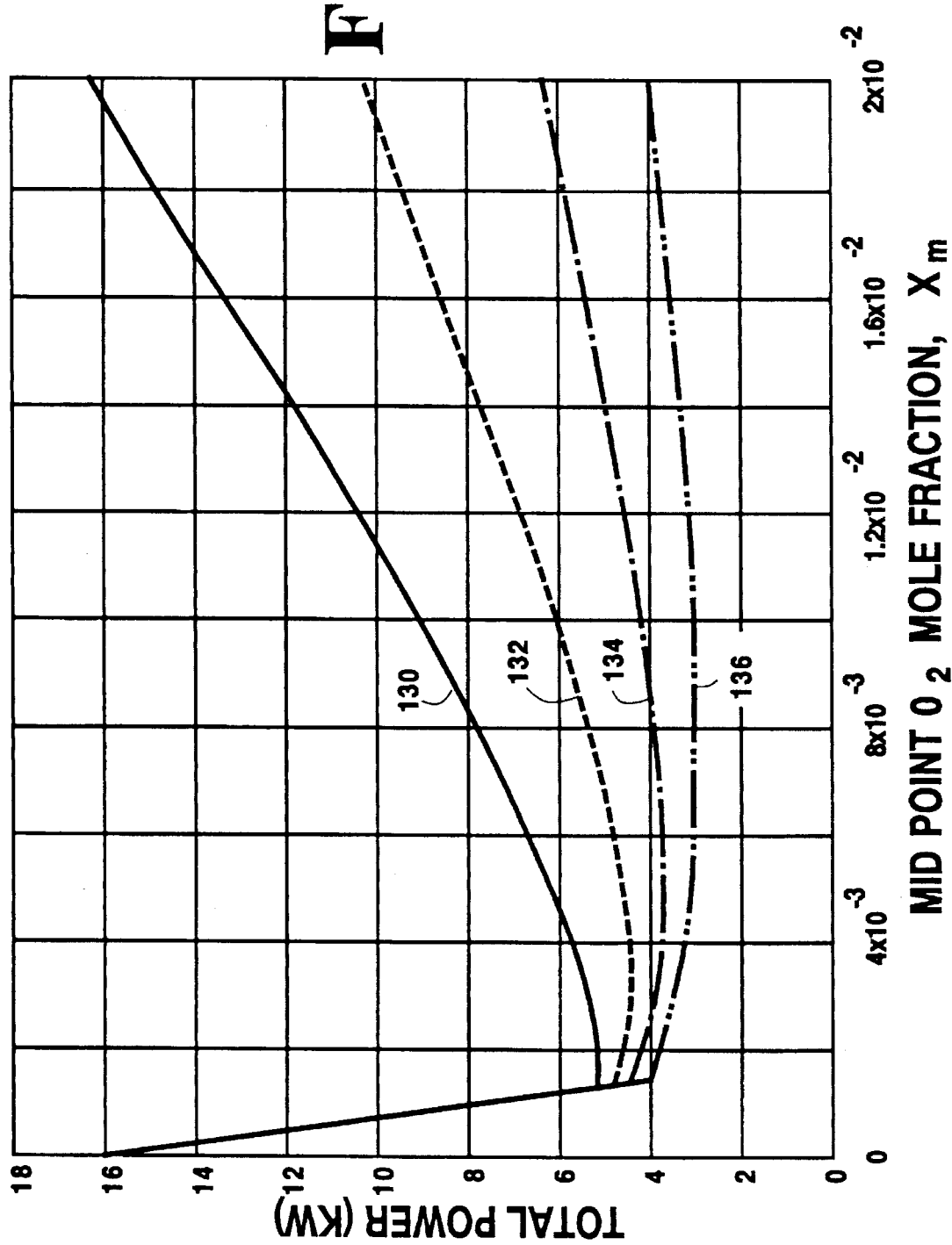
FIG. 4 is a graph on a linear scale depicting the power required to drive the system of FIG. 2 as a function of the mole fraction of the midstage oxygen concentration.

The dependence of the total power on the midstage oxygen concentration, that is, on the oxygen-depleted product flowing via exit duct 80, FIG. 2, through inlet duct 82 into the first gas chamber 56b of the second process stage 54, has been investigated and the results are plotted on a linear scale in FIG. 4. The same conditions as given above regarding FIG. 3 are assumed, including feed oxygen concentration $X_f$ of 2% and an overvoltage of 50% per stage. The following curves are generated according to the oxygen mole fraction $X_p$ in the final retentate product stream: curve 130 is $10^{-9}$ (1 part per billion); curve 132 is $10^{-6}$ (1 part per million); curve 134 is $10^{-4}$ and curve 136 is $10^{-3}$.

The best value for midpoint oxygen concentration $X_m$ depends on the value of $X_p$ specified, but the overall power is not very sensitive to the exact value of $X_m$. The minimum total power ranges between 3 and 5 kW, depending on the product purity $X_p$. For a product $O_2$ purity of 1 ppb and for the process conditions and gas flows indicated in the above example, the total power is indicated to be 4.9 kW. This corresponds to voltages of 0.15 V and 0.65 V and currents of 221,600 A and 2,500 A in process stages 52 and 54, respectively. If one is willing to accept a lower purity product, then $X_m$ may be closer to a $10^{-2}$ mole fraction, but if one requires a higher purity product then $X_m$ must be closer to a $10^{-3}$ mole fraction.

This example demonstrates that a substantial decrease in the power can be achieved by using two or more process stages, but most of the benefit is attained in a two stage process according to the present invention. Additional stages may be employed, according to this invention, and may be desirable when multiple permeation modules are otherwise needed, but most of the power efficiency can be attained in a two or three stage process.

Figure 5:
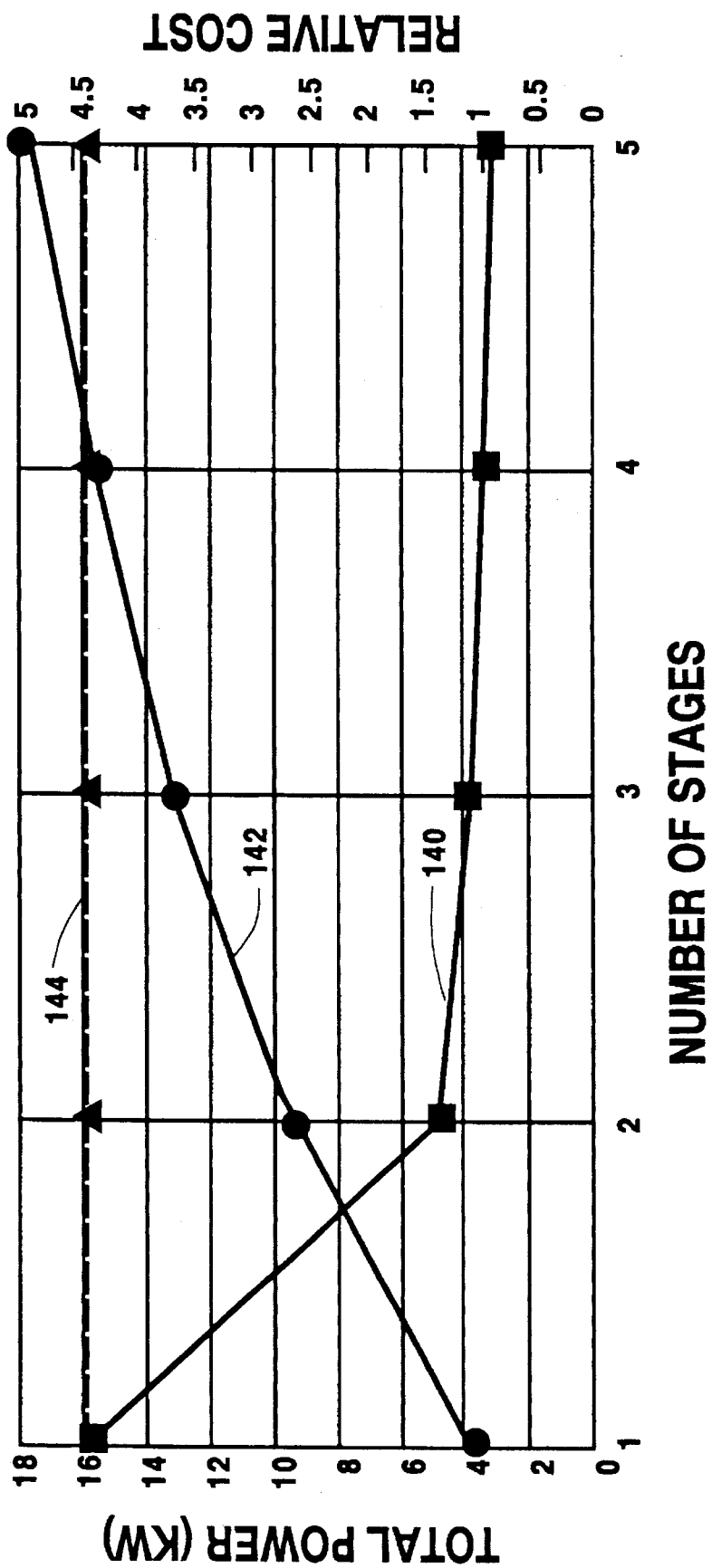
FIG. 5 is a graph depicting power and capital cost as function of the number of stages utilized according to the present invention.

The impact of the number of stages according to the present invention on the total power in kilowatts, curve 140, and on relative capital costs, curve 142, are shown schematically in FIG. 5. The following conditions are assumed: a feed flow of 10,000 NCFH, a feed oxygen concentration of 2%, a feed pressure of 100 psig, an anode side pressure of 15 psia, a product concentration of 1 ppb, an overvoltage of 50%, a temperature of 800° C., and power consumed by each successive stage being less than 50% of the preceding stage. The capital costs include the SELIC membrane separator costs for the addition of each extra stage.

By comparison, if an increasing number of prior art apparatus 20, FIG. 1, were connected in series and operated as a single stage (all at the same voltage), and the X-axis in FIG. 5 represented the number of the apparatus 20, a constant total power curve 144 would be generated while the relative capital costs increased as shown by curve 142. By conventionally operating a number of the apparatus 20 as a single stage, the initial apparatus would be overpowered relative to the needs of the successive apparatus. The last apparatus necessarily has the largest Nernst voltage requirements, but the first apparatus has the largest current requirements. The total power, which is the product of the high voltage and current, therefore would be much greater than the total power consumed by a multistage system according to the present invention.

Figure 6:
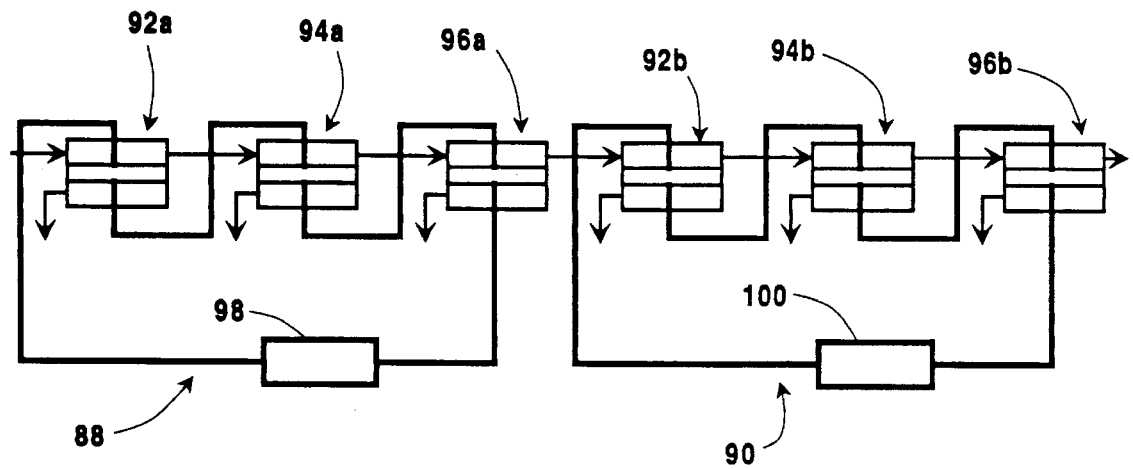
FIG. 6 is a schematic representation of an alternative system embodying the invention using solid electrolyte in a multiple stage process wherein process modules are in feed series within each process stage.

The invention has been illustrated by the two stage process depicted in FIG. 2, where each stage is comprised of a single module or cell. It is likely that for all but the smallest applications, each stage would be assembled from two or more modules, where each module contained one, two or more cells. Process stages 88, 90, FIG. 6, each contain a plurality of individual process modules 92a, 94a, 96a and 92b, 94b, 96b, respectively. The process modules of the process stage 88 are connected in a series feed arrangement and are electrically energized serially by a power source 98. The process modules of stage 90 are also connected in a feed series relationship and are electrically energized serially by a power source 100. Since, in general, the voltage required across each process module is quite low, it is advantageous to connect the individual process modules electrically in series, so that the supply voltage is higher. Thus $V_1$ in FIG. 6 is the sum of the voltages across the individual process modules 92a, 94a, 96a in the first process stage 88. Similarly, $V_2$ is the sum of the voltages across the individual process stages in the second process stage 90. In keeping with the inventive concept herein, $V_2$ would be larger than $V_1$ even as the current generated by the power source 100 is substantially less than that generated by the power source 98.

The system of the invention is capable of decreasing oxygen in the retentate gas to relatively low levels. Increasing the membrane area in a stage (such as by adding more modules, or more cells per module), increasing the power in that stage, or both, results in more oxygen being removed from that stage and therefore a decreased oxygen concentration in the retentate gas.

Figure 7:
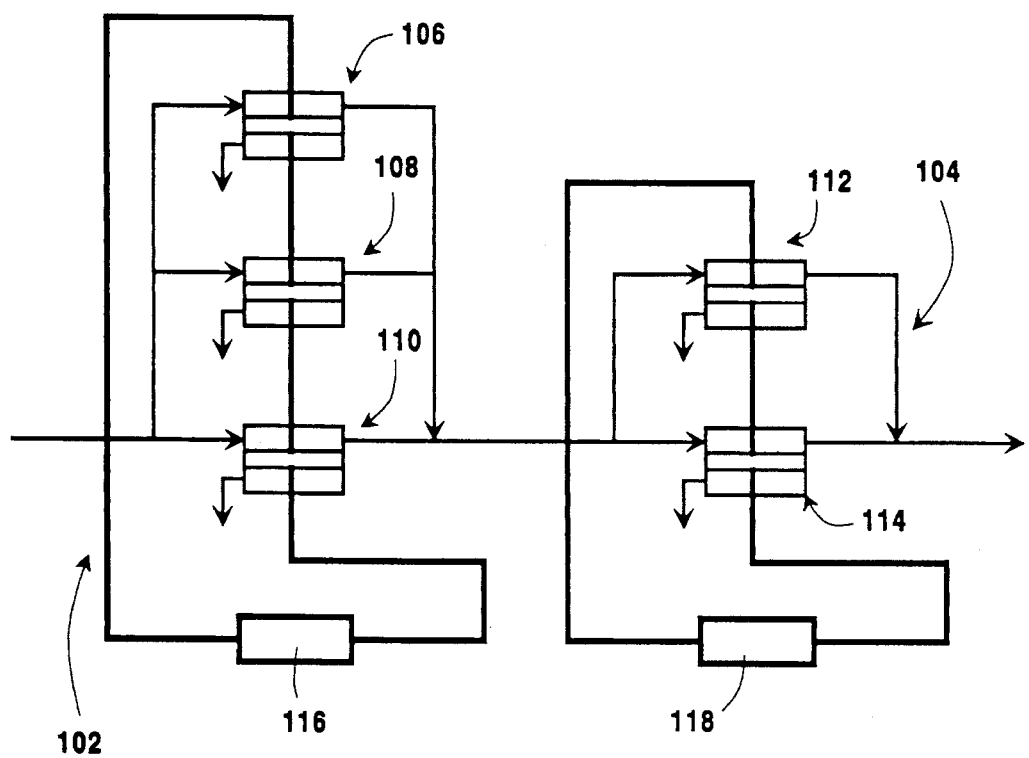
FIG. 7 is a schematic representation of another alternative system embodying the invention using solid electrolyte in a multiple stage process wherein process modules are in feed parallel within each process stage.

An alternative construction for connecting multiple process stages 102, 104 is shown schematically in FIG. 7. In this instance, a plurality of individual process modules 106, 108, 110 in process stage 102, and another plurality of individual process modules 112, 114 in process stage 104, are connected in parallel with respect to the flow of the gas stream. The two process stages 102, 104 are, however, connected in series with respect to this feedflow. The individual process modules in each process stage are driven electrically in series by power sources 116, 118, respectively to elevate the supply voltages for each module to more convenient and practical levels.

Fewer modules are needed in second stage 104 than in first stage 102 because less oxygen is present in the feed gas at that stage. There is less oxygen to be removed, and therefore less surface area is required. Further, the parallel feed arrangement of modules 112, 114 enables beneficial use of a higher voltage and a lower current for second stage 104.

Since the Nernst voltage (Equation (3)) is governed by the partial pressure of oxygen on the two sides of the membrane, it can also be altered by changing the total pressure of the gas. Increasing the feed stream pressure or decreasing the waste stream pressure, as for example by vacuum pumping this stream, will reduce the Nernst voltage. In the extreme, the voltage can be reduced to zero or made negative (when the oxygen partial pressure is higher in the feed than in the waste) and the oxygen flux and flow can be driven entirely by pressure. The oxygen partial pressure can also be reduced by purging this side of the membrane with a stream relatively free of oxygen, provided that such a stream is available. This is usually the case in many locations where this purification process would be employed. It is also possible and feasible to employ some of the product as a purge stream.

This invention enables efficient use of different materials for SELIC membranes in each stage. In one construction, for example, a first stage membrane is a doped bismuth oxide such as Material #2 in Table 1 above, which exhibits high oxygen ion conductivity but is unstable at low oxygen partial pressures or higher voltages. The second stage membrane is Material #1 in Table 1, which exhibits a much lower oxygen ion conductivity but is stable at low oxygen partial pressures. Of course, different materials have different resistances and overvoltage requirements, which affects actual voltage levels needed for operating each stage according to the present invention.

The invention is intended to be used in commercial processes for the production of oxygen and also for the separation of oxygen from mixed gas streams to produce high-purity, oxygen-depleted retentate gas. This need is satisfied in an optimum manner by the present invention.

Specific features of the invention are shown in one or more of the drawings for convenience only, as each feature may be combined with other features in accordance with the invention. Alternative embodiments will be recognized by those skilled in the art and are intended to be included within the scope of the claims.

What is claimed is:

1. A process of separating oxygen from a feed gas stream including a mixture of oxygen and at least one other gas to produce enriched oxygen permeate and oxygen-depleted retentate gas, the process comprising:

introducing the feed gas into a first gas chamber of a first process stage of at least two process stages arranged in a series feed relationship, the first chamber being separated from a second gas chamber by a first electrolyte membrane;

selecting a first oxygen flux through the first membrane and providing a first electrical current to and a first voltage across the first membrane to drive oxygen substantially at the first flux to obtain oxygen depleted retentate gas from the first chamber and enriched oxygen permeate from the second chamber;

delivering oxygen-depleted retentate gas from the first process stage to a third gas chamber of a second process stage, the third chamber being separated from a fourth gas chamber by a second electrolyte membrane; and selecting a second oxygen flux through the second membrane and providing a second electrical current to and a second voltage across the second membrane to drive oxygen substantially at the second flux to obtain oxygen depleted retentate gas from the third chamber and enriched oxygen permeate from the fourth chamber, the second current being smaller than the first current and the second voltage being larger than the first voltage.

2. The process of claim 1 wherein less than six stages are utilized.

3. The process of claim 1 wherein the second voltage is at least ten percent larger than the first voltage, both voltages being calculated according to the Nernst Equation.

4. The process of claim 1 wherein the second stage is one of at least two stages successive to the first stage, and each successive stage utilizes a voltage an least ten percent larger than the voltage the preceding stage, all voltages being calculated according to the Nernst Equation.

5. The process of claim 4 wherein each successive stage utilizes a smaller current than the current of the preceding stage.

6. The process of claim 5 wherein the power consumed by each successive stage is less than fifty percent of the power consumed by the preceding stage.

7. The process of claim 1 wherein at least one of the stages has at least two modules, each module including an electrolyte membrane.

8. The process of claim 7 wherein the modules within the stage are connected electrically in series and are connected in a parallel feed arrangement.

9. The process of claim 7 wherein the modules within the stage are connected electrically in series and are connected in a series feed arrangement.

10. The process of claim 1 wherein the electrolyte membrane in one of the stages is formed of a different material than is present in the membranes in the other stages.

11. The process of claim 1 wherein the feed gas is air.

12. The process of claim 1 including withdrawing the enriched oxygen permeate from the second and fourth gas chambers of the first and second stages as an oxygen-containing product stream, and withdrawing the oxygen-depleted retentate gas from the second process stage as a retentate product stream.

13. The process of claim 1 wherein the composition of the retentate gas obtained from the third chamber is less than about five percent oxygen.

14. The process of claim 1 wherein the feed gas is heated to a temperature between 400° C. and 1200° C.

15. A process of separating oxygen from a feed gas stream including a mixture of oxygen and at least one other gas to produce enriched oxygen permeate and oxygen-depleted retentate gas, the process comprising:

introducing the feed gas into a first gas chamber of a first process stage of at least three process stages arranged in a series feed relationship, the first chamber being separated from a second gas chamber by a first electrolyte membrane;

selecting a first oxygen flux through the first membrane and providing a first electrical current to and a first voltage across the first membrane to drive oxygen substantially at the first flux to obtain oxygen depleted retentate gas from the first chamber and enriched oxygen permeate from the second chamber;

delivering oxygen-depleted retentate gas from the first process stage to a third gas chamber of a second process stage, the third chamber being separated from a fourth gas chamber by a second electrolyte membrane;

selecting a second oxygen flux through the second membrane and providing a second electrical current to and a second voltage across the second membrane to drive oxygen substantially at the second flux to obtain oxygen depleted retentate gas from the third chamber and enriched oxygen permeate from the fourth chamber, the second current being smaller than the first current and the second voltage being larger than the first voltage;

the second stage being one of at least two stages successive to the first stage, each successive stage utilizing a voltage at least ten percent larger than the voltage of the preceding stage, all voltages being calculated according to the Nernst Equation;

each successive stage utilizing a smaller current than the current of the preceding stage; and at least one of the stages having at least two modules, each module including an electrolyte membrane.

16. The process of claim 15 wherein each electrolyte membrane includes a cathode connected to a retentate side and an anode connected to a permeate side of the membrane, the cathode and anode being energized to drive oxygen substantially at an oxygen flux selected for that membrane.

17. The process of claim 16 wherein the modules within at least the first and second process stages are connected electrically in series and are connected in a parallel feed arrangement.

18. The process of claim 16 wherein the modules within at least the first and second process stages are connected electrically in series and are connected in a series feed arrangement.

19. The process of claim 16 wherein the power consumed by each successive stage is less than fifty percent of the power consumed by the preceding stage to that successive stage.

20. The process of claim 16 wherein the electrolyte membrane in one of the stages is formed of a different material than is present in at least one of the membranes in at least one of the other stages.

* * * * *